United States Patent

[11] 3,609,395

[72] Inventor Zbigniew J. Jania
Northville, Mich.
[21] Appl. No. 68,837
[22] Filed Sept. 2, 1970
[45] Patented Sept. 28, 1971
[73] Assignee Ford Motor Company
Dearborn, Mich.

[54] FREQUENCY TO VOLTAGE CONVERTER CIRCUIT
12 Claims, 3 Drawing Figs.

[52] U.S. Cl. .......... 307/233, 307/202, 307/261, 324/78 J
[51] Int. Cl. .......... G01r 23/02, H02h 7/20
[50] Field of Search .......... 307/233, 261, 271, 202; 324/78 J

[56] References Cited
UNITED STATES PATENTS

| | | | |
|---|---|---|---|
| 3,187,202 | 6/1965 | Case | 307/233 |
| 3,026,469 | 3/1962 | Wilbur et al. | 307/202 X |
| 3,302,034 | 1/1967 | Nowell | 307/261 X |
| 3,466,550 | 9/1969 | Wolf et al. | 307/233 X |

*Primary Examiner*—John S. Heyman
*Attorneys*—John R. Faulkner and Robert W. Brown

ABSTRACT: An improved frequency to voltage conversion circuit is described. The unimproved basic circuit comprises a transistor, two capacitors, a resistor, and a diode. The improved circuit includes transistor means connected to the base of the transistor in the basic circuit to provide temperature compensation and to reduce or eliminate transient conditions. Additional transistors, diodes, and resistors are provided to effect protection against supply voltage transients, to provide additional temperature compensation where necessary, to assure the presence of an adequate signal to operate the frequency to voltage converter, and to provide the overall circuit with a high input impedance and a low output impedance.

PATENTED SEP 28 1971 3,609,395

INVENTOR.

ZBIGNIEW J. JANIA

BY John R. Faulkner

Robert W. Brown

ATTORNEYS

FREQUENCY TO VOLTAGE CONVERTER CIRCUIT

BACKGROUND OF THE INVENTION

This invention relates to a circuit for the conversion of a periodic electrical signal to a signal having an average voltage proportional to the frequency of the periodic signal. More particularly, the present invention relates to improvements made upon a known and basic transistorized frequency-to-voltage converter circuit.

Various circuits for the conversion from frequency to voltage are known and have found widespread application. One basic and well-known frequency-to-voltage converter circuit comprises a transistor, a first capacitor having one of its terminals connected to the emitter of the transistor and having the periodic electrical signal applied to its other terminal, a second capacitor, a resistor connected in parallel with the second capacitor, and a diode connected between the emitter of the transistor and one of the terminals of the second capacitor. The function of this circuit is to convert the periodic input signal of varying frequency to an output having a voltage proportional to the frequency of the periodic electrical input signal. A circuit containing the above described elements to effect the conversion of frequency to voltage is illustrated in U.S. Pat. No 3,356,082, issued Dec. 5, 1967, to N. A. Jukes, the frequency-to-voltage converter circuit there illustrated being incorporated into a larger circuit. As is clearly illustrated in this reference patent, the periodic electrical signal applied to the first capacitor of the basic circuit may itself be derived from a separate transistor to which is applied the periodic input signal to be converted.

The basic transistorized frequency-to-voltage converter circuit, although functional, has several deficiencies. For example, the base current for the transistor in the circuit is obtained from a relatively high impedance source which causes a transient condition to appear in the output of this transistor when it changes from a nonconductive to a conductive state. Also, the output voltage of the circuit is a function of the frequency of the input signal and of a proportionality factor which is a function of the transistor base-to-emitter voltage drop and of the diode voltage drop; these voltage drops vary with transistor temperature, and hence with ambient temperature, in the same direction to effect a change in the frequency-to-voltage proportionality factor. An additional deficiency in the basic frequency-to-voltage converter circuit resides in the fact that at very low frequencies, and thus at low output voltages, the output voltage becomes a nonlinear function of the frequency of the periodic input signal. A further deficiency in the basic circuit is that it is particularly vulnerable to high-voltage positive transient conditions which may occur in the voltage supply line; the incidence of a sufficiently high voltage surge causes breakdown of the collector-base junction of the transistor and consequent destruction of it.

SUMMARY OF THE INVENTION

The present invention overcomes the above described deficiencies of the basic transistorized frequency-to-voltage converter circuit. The improved circuits of the invention have incorporated therein means for compensating for ambient and transistor temperature changes and also means for preventing deleterious effects resulting from transient conditions in the supply line or other portions of the circuit. Where the periodic electrical signal which is applied through the first capacitor to the transistor of the basic frequency-to-voltage converter circuit is derived from a second transistor or transistors, the invention provides resistance and diode means to assure changes in state of the second transistor or transistors in response to variations in the periodic input signal to be converted. Another advantage of the improved circuits of the invention is that they have a high input impedance and a low output impedance.

Because of the above and other improvements in the circuits of the invention, they may function as general purpose frequency-to-voltage converters. The frequency-to-voltage converter circuits of the invention may be comprised of discrete electrical elements or of integrated, or at least partially integrated, circuit components.

The improved frequency-to-voltage converter circuits of the invention, free from the deficiencies of the basic circuit, have great versatility. For example, these circuits, whether comprised of discrete or integrated circuit elements, may be used as basic functional components in speed-related automotive systems, such as speed control systems, electronic cableless speedometers, skid control systems, engine emission control systems, electronic automatic transmission controls, or tachometer systems.

These and other advantages and applications of the improved circuits of the invention are made apparent upon reference to the detailed description which follows and to the drawings.

DETAILED DESCRIPTION

Figures 1, 2, 3:
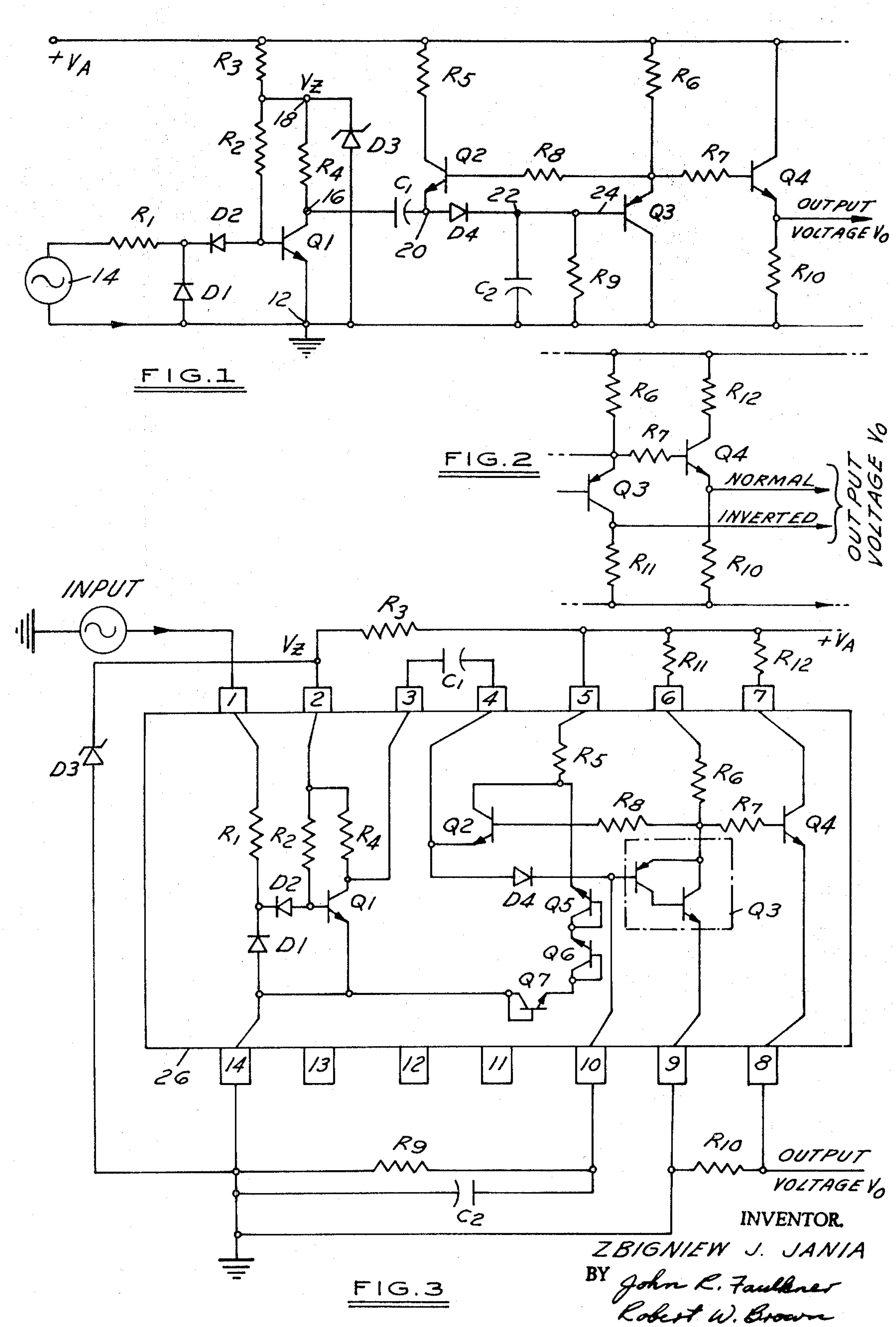
FIG. 1 is a schematic diagram of an improved frequency-to-voltage converter circuit.
FIG. 2 is a modification of a portion of the circuit illustrated in FIG. 1.
FIG. 3 is a schematic diagram, substantially similar to the schematic diagram of FIG. 1, comprised of an integrated circuit and various discrete components.

The detailed description which follows contains references to voltages of stated polarity and to transistors illustrated as being of a particular type, that is, PNP or NPN. It should be understood that these voltage polarities and transistor types may be interchanged, provided that absolute voltage values and relationships are maintained.

With particular reference to FIG. 1, there is shown a schematic diagram of one embodiment of the improved frequency-to-voltage converter of the invention. The circuit includes the elements of the basic frequency-to-voltage converter to which reference has previously been made. These elements are transistor Q2, capacitor $C_1$, diode D4, capacitor $C_2$, and resistor $R_9$. The operation of these elements is described hereinafter in connection with the overall discussion of the circuit operation.

The circuit of FIG. 1 is adapted for connection to a source of DC voltage at terminals 10 and 12, the latter terminal being shown connected to ground and the voltage $V_A$ at terminal 10 being positive with respect to ground. The periodic electrical input signal to the circuit is represented by a signal source 14 having one side connected to the ground line and the other side connected to one terminal of a resistor $R_1$. A diode D1 is connected from the other terminal of the resistor $R_1$ to ground. Another diode D2 is also connected to this terminal of $R_1$ and to the base of a transistor Q1. The base of the transistor Q1 is also connected to one terminal of a resistor $R_2$, the other terminal of this resistor $R_2$ being connected through a resistor $R_3$ to the source of voltage $V_A$. Electrically connected to the junction between resistors $R_2$ and $R_3$ are a resistor $R_4$ and a reverse-biased zener diode D3. Resistor $R_4$ is also connected at 16 to the collector of transistor Q1 and also to the left side, as viewed in FIG. 1, of capacitor $C_1$. The emitter of the transistor Q1 is connected to ground, as is the remaining terminal of the zener diode D3. Zener diode D3 is used for the purpose of voltage regulation and provides a substantially constant voltage $V_z$ at junction 18. Diode D1 protects the base-emitter junction of the transistor Q1 against large negative excursions of the periodic input signal.

The right side of capacitor $C_1$ is connected to the emitter of the transistor Q2. The collector of the transistor Q2 is connected through a resistor $R_5$ to the supply voltage $V_A$.

A diode D4 is connected at 20 to the emitter of the transistor Q2 and to the right-hand terminal of the capacitor $C_1$. The other terminal of the diode D4 is connected at 22 to one side of a capacitor $C_2$, the other side of the capacitor $C_2$ being connected to ground. Connected in parallel with the capacitor $C_2$ is a resistor $R_9$. The capacitor $C_2$ and the resistor $R_9$ are connected by conductive line 24 to the base of the transistor Q3. Their respective opposite terminals are connected to ground, as is the collector of transistor Q3. The emitter of the transistor Q3 is connected through a current limiting resistor $R_8$ to the base of the transistor Q2. The emitter of the transistor Q3 is also connected through a resistor $R_6$ to the source of voltage $V_A$ and through current limiting resistor $R_7$ to the base of a transistor Q4. The collector of the transistor Q4 is connected to the source of voltage supply $V_A$, while its emitter is connected through an output resistor $R_{10}$ to ground. The output voltage $V_o$, proportional to the frequency of the periodic electrical input signal, is taken across the output resistor $R_{10}$, as is illustrated in FIG. 1.

In operation, signal source 14 supplies a periodic electrical input signal. Because signal source 14 is connected to ground at 12, the opposite side thereof makes periodic excursions from a positive value to a negative value, and back again to a positive value. In prior art circuits, the resistor $R_2$ and the diode $D_2$ would be absent, and the periodic input signal would be applied directly through the resistor $R_1$ to the base of the transistor Q1. However, the presence of the resistor $R_2$ and the diode D2 provides means to assure a change from the nonconductive to the conductive state of the transistor Q1 in response to the periodic variations from the signal source 14. This assurance of adequate base drive for transistor Q1 occurs because the base is connected through resistor $R_2$ to the source of regulated supply voltage $V_z$. Thus, as the signal source proceeds from its most negative value toward its highest positive value, a point is reached at which the base of the transistor Q1 becomes sufficiently positive with respect to its emitter to cause conduction of the transistor Q1. Saturation of the transistor Q1 subsequently occurs. This results because diode D2 becomes reverse biased during the course of the positive excursion of the periodic input signal, and current flows from regulated supply line $V_z$ through resistor $R_2$ to the base of the transistor Q1.

During the course of the excursion of the periodic signal from its positive peak toward its negative peak, the diode D2 again becomes forward biased, and the voltage at the base of the transistor Q1 becomes sufficiently low to cause the transistor Q1 to change from its conductive state to its nonconductive state. Thus, it is apparent that the transistor Q1 continuously changes from a conductive state to a nonconductive state in a manner corresponding to the frequency of the periodic electrical input signal. When the transistor Q1 is conductive, the voltage at its collector (point 16) is equal to the collector-to-emitter saturation voltage of the transistor Q1. When the transistor Q1 becomes nonconductive, the voltage at point 16, after a slight delay caused by the charging of capacitor $C_1$ in series with capacitor $C_2$, becomes equal to the regulated supply line voltage $V_z$. Therefore, the voltage at point 16 is in the form of a square wave having a frequency corresponding to that of the periodic input signal obtained from the signal source and having high and low voltage values established, respectively, by the regulated supply voltage $V_z$ and the collector-to-emitter saturation voltage of the transistor Q1.

The square wave signal at point 16, that is, at the collector of the transistor Q1, in effect becomes the periodic input signal to the elements of the basic frequency-to-voltage converter. As was previously stated, these elements of the basic converter circuit comprise the transistor Q2, the capacitor $C_1$, the diode D4, and the parallel combination of the capacitor $C_2$ and the resistor $R_9$. The operation of the basic converter circuit is well understood in the art, but nevertheless is detailed in the paragraphs which follow for the sake of completeness of the overall description of the invention.

In order to assist in assuring proper operation of the basic frequency-to-voltage converter circuit, the time constant $R_4C_1$ should be much less than the interval of time during which the transistor Q1 is in a nonconductive state, this time interval usually being shortest for the maximum frequency of the periodic input signal for which the converter circuit is to function; it is considered sufficient if the time constant $R_4C_1$ is less than one-tenth of the interval during which transistor Q1 is in a nonconductive state. Furthermore, time constant $R_5C_1$ should be less than one-tenth of the time constant $R_4C_1$ so that the right side of capacitor $C_1$ is always held near the value of the voltage across the capacitor $C_2$. In addition, the time constant $R_9C_2$ should be much greater than the time constant $R_4C_1$ so that, during the time when both capacitors $C_1$ and $C_2$ are being charged from $V_z$ through resistor $R_4$, discharge of the capacitor $C_2$ through the resistor $R_9$ is negligibly small.

When a periodic input signal is applied to the circuit of FIG. 1 from signal source 14, the capacitor $C_2$ attains a voltage across it the average value of which is proportional to the frequency of the input signal. Although the average value of the voltage across the capacitor $C_2$ is proportional to the frequency of the input signal and remains constant when the input frequency remains constant, nevertheless, the voltage across the capacitor $C_2$ varies with time. This voltage across the capacitor $C_2$, which may be regarded as the voltage at point 22, increases rapidly when the transistor Q1 becomes nonconductive and then exponentially decreases as the capacitor C2 partially discharges through the resistor $R_9$, the time constant of discharge being large compared to the other time constants involved in the circuit. These events are repeated each time that the transistor Q1 changes from its conductive state to its nonconductive state. The cyclical charging and partial exponential decay of the voltage at point 22 results in an average voltage which is determined by the frequency of the input signal and which is proportional to that frequency.

The manner in which the circuit functions to maintain the above relationship between the input signal and the voltage across capacitor $C_2$ may be described in terms of the voltage at point 16, that is, at the collector of transistor Q1. When the transistor Q1 is conducting, the voltage at point 16 is equal to the collector-to-emitter saturation voltage. However, when the transistor Q1 changes from its conductive state to its nonconductive state in response to the periodic input signal, the voltage at point 16 increases. Current then flows from regulated voltage $V_z$ through resistor $R_4$, capacitor $C_1$, diode D4 and into capacitor $C_2$. This continues for a relatively short time compared to the period of the input signal because capacitor $C_1$ rapidly becomes fully charged through resistor $R_4$, and the voltage at point 16 becomes equal to voltage $V_z$. At this time, capacitor $C_2$ begins its exponential discharge through resistor $R_9$. When the input signal causes transistor Q1 to become conductive once again, the voltage at point 16 again decreases to the collector-to-emitter saturation value for transistor Q1. This causes capacitor $C_1$ to be charged in the opposite direction through the transistor Q2, which becomes conductive at this time. The capacitor $C_2$ cannot become further charged through the transistor Q2 during this interval because the diode D4 is reverse-biased. The capacitor $C_2$ continues its exponential decay through the resistor $R_9$ during this interval. The diode D4 remains reverse-biased, provided that the exponential decay of the voltage across capacitor $C_2$ decreases sufficiently slowly with time, until the input signal again causes the transistor Q1 to become nonconductive. The cycle is then repeated.

In the prior art basic frequency-to-voltage converter, the base of the transistor Q2 would be connected directly to the point 22, and the output voltage $V_o$ would be taken at this point. Thus, with the prior art connection, the average value of the output voltage $V_o$ taken across capacitor $C_2$ is given by the following equation:

$V_o=[V_z-V_{BE}-V_d-V_{CE(SAT)}]C_1R_9f$ where $V_{BE}$ is the voltage drop from the base to the emitter of the transistor Q2, where $V_d$ is the voltage drop across the diode D4, where $V_{CE(SAT)}$ is the voltage drop from the collector to the emitter of the transistor Q1 when it is saturated, and where $f$ is the frequency of the periodic electrical input signal. The above equation closely approximates the output voltage $V_o$ of the prior art circuit where the capacitance of capacitor $C_2$ is much greater than the capacitance of capacitor $C_1$.

If the voltages contained within the brackets of the equation are considered to be constants, and if capacitance $C_1$ and resistance $R_9$ are also so considered, then it is apparent that the output voltage $V_o$ of the prior art circuit is a linear function of frequency $f$. The capacitance and resistance values indeed may be regarded as constants, as may be the bracketed voltages where the transistor and diode temperatures remain fixed. However, where the circuit is subjected to temperature variations, $V_{BE}$ and $V_d$ also vary. Moreover, $V_{BE}$ becomes nonlinear when the frequency from the signal source is very low. Thus, a graph for the prior art circuit of output voltage $V_o$ plotted against frequency shows a nonlinear portion at low frequencies and correspondingly low output voltages. Also, with the prior art connection of the base of transistor Q2 to point 22, the base current for the transistor is obtained from a relatively high impedance point. This introduces transients into the operation of the transistor Q2 when it changes from a nonconductive to a conductive state.

The addition of the transistors Q3 and Q4 overcomes these disadvantages of the prior art system. With the circuit of the invention, the base of the transistor Q2 is connected through the current limiting resistor $R_8$ to the emitter of the transistor Q3. The base of the transistor Q3, in turn, is connected to point 22, the point at which the voltage proportional to the frequency of the periodic input signal is obtained. This causes the voltage applied to the base of the transistor Q2 to exceed, by an amount equal to the emitter-to-base voltage of the transistor Q3, the voltage at point 22.

With the base of the transistor Q2 connected to the emitter of the transistor Q3, the base current for transistor Q2 is obtained from a relatively low impedance source and transient conditions which would otherwise occur when the transistor Q2 changes from its nonconductive to its conductive state are substantially eliminated. Also, the average voltage $V_o$ at point 22 is governed by the following equation:

$V_o=[V_z-V_d-V_{CE(SAT)}]C_1R_9f$ This is also a linear function of frequency. The only difference between the above equation and the equation previously given for the prior art system is that the voltage $V_{BE}$ has been eliminated. This result occurs where the transistors Q2 and Q3 are similar devices, that is, where they have identical base-to-emitter voltage drops. Thus, the nonlinearity present in the prior art circuit at low input frequencies and output voltages is eliminated, as is the fluctuation which results from temperature variations of the transistor Q2.

As was earlier stated, the voltage drop $V_d$ across the diode D4 also varies with temperature. If temperature compensation for this condition is required, it can be obtained by the addition of a forward-biased diode connected in series with the zener diode D3.

The output voltage $V_o$ in the circuit of the invention is taken across the resistor $R_{10}$. The reason for this is that the transistor Q3 preferably has a high current gain (on the order of 100) and provides the overall circuit with a high input impedance and a low output impedance. The output voltage could be taken at the emitter of the transistor Q3, but the voltage at this point is one emitter-to-base voltage above the voltage at the point 22. In order to avoid this and because the emitter-to-base voltage of the transistor Q3 is sensitive to temperature, the transistor Q4 has been added and connected to the transistor Q3 as shown. This causes the base-to-emitter voltages of transistors Q3 and Q4 to balance each other, thereby, to make the operation of the circuit independent of temperature.

Resistors $R_5$ and $R_6$ protect the transistors against supply voltage transients. Further protection is obtained by means of resistors $R_7$ and $R_8$.

With reference now to FIG. 2, there is shown a modification of the circuit of FIG. 1, with like numerals corresponding to like devices. The difference between this circuit and that shown in FIG. 1 is that resistors $R_{11}$ and $R_{12}$ have been added. The advantage obtained by the addition of the resistor $R_{11}$ is that an inverted output may be obtained. The inverted output is a voltage $V_o$ which is inversely proportional to the frequency of the periodic input signal, that is, the inverted output is a voltage which decreases with increasing frequency of the input signal. A normal, directly proportional, voltage may be obtained across the resistor $R_{10}$ as has been previously described.

FIG. 3 is a schematic diagram of a circuit similar to that illustrated in FIGS. 1 and 2, with like numerals corresponding to like devices. It differs from the embodiments previously described, however, in that it is comprised of a combination of integrated circuit elements and discrete elements. Thus, many of the resistors, the diodes, and the transistors are shown constructed within a monolithic "chip" 26. The chip has a plurality of terminals, numbered 1 through 14, to which the discrete circuit elements are connected.

In the embodiment of FIG. 3, the transistor Q3 is replaced by a low-gain PNP transistor ("lateral" transistor) and a normal diffused epitaxial NPN high-gain transistor, both units acting together like a discrete PNP high-gain device. Additional protection against supply voltage transients is provided by a series of reverse-biased emitter-base junctions Q5, Q6 and Q7 diffused on the chip. This series of devices acts like a zener diode, each of the devices having a particular breakdown voltage.

Based upon the foregoing description of the invention, what is claimed and desired to be protected by Letters Patent is:

1. A circuit for the conversion of a periodic electrical signal to a signal having an average voltage proportional to the frequency of the periodic electrical signal, which comprises: a first transistor; a first capacitor having one of its terminals connected to the emitter of said first transistor and having the periodic electrical signal applied to its other terminal; a second capacitor; a resistor connected in parallel with said second capacitor; a diode connected between the emitter of said first transistor and one of the terminals of said second capacitor; and transistor means connected to the base of said first transistor for causing the voltage applied thereto to exceed in absolute value the value of the voltage existing at said one terminal of said second capacitor.

2. A circuit in accordance with claim 1, wherein said transistor means comprises a second transistor having its emitter connected to the base of said first transistor and its base connected to said one terminal of said second capacitor, thereby to cause the voltage applied to the base of said first transistor to exceed, by an amount approximately equal to the emitter-to-base voltage of said second transistor, the value of the voltage existing at said one terminal of said second capacitor.

3. A circuit in accordance with claim 2, which further includes: a third transistor having its base connected to the emitter of said second transistor; and an output resistance connected to the emitter of said third transistor.

4. A circuit in accordance with claim 2, wherein said second transistor has a high gain to provide the frequency-to-voltage converter circuit with a high input impedance and a low output impedance.

5. A circuit in accordance with claim 2, which further includes resistance means connected in electrical circuit with said second transistor for providing an output voltage inversely proportional to the frequency of the periodic electrical signal.

6. A circuit for the conversion of a periodic electrical input signal to a signal having an average voltage proportional to the frequency of the periodic input signal, which comprises: a first transistor, the periodic input signal being applied between the base and the emitter of said first transistor to cause said first transistor to change from a conductive to a nonconductive state and back to a conductive state in response to the variation of the periodic electrical input signal; a second transistor; a first capacitor having one of its terminals connected to the emitter of said second transistor and its other terminal connected to the collector of said first transistor; a second capacitor; a resistor connected in parallel with said second capacitor; a first diode connected between the emitter of said second transistor and one of the terminals of said second capacitor; and transistor means connected to the base of said second transistor to cause the voltage applied thereto to exceed in absolute value the value of the voltage existing at said one terminal of said second capacitor when said first transistor is in a conductive state.

7. A circuit in accordance with claim 6, which further includes resistance and diode means connected to the base of said first transistor to assure its change of state in response to variation of said periodic electrical input signal.

8. A circuit in accordance with claim 6, which further includes resistance means connected in electrical circuit with said third transistor for providing an output voltage inversely proportional to the frequency of the periodic electrical input signal.

9. A circuit in accordance with claim 6, wherein said transistor means comprises a third transistor having its emitter connected to the base of said second transistor and having its base connected to said one terminal of said second capacitor, thereby, to cause the voltage applied to the base of said second transistor to exceed, by an amount approximately equal to the emitter-to-base voltage of said third transistor, the value of the voltage existing at said one terminal of said second capacitor.

10. A circuit in accordance with claim 9, which further includes: a fourth transistor having its base connected to the emitter of said third transistor; and an output load resistance connected to the emitter of said fourth transistor, the voltage output being taken across said load resistance.

11. A circuit in accordance with claim 10, which further includes resistance and diode means connected to the base of said first transistor to assure its change of state in response to variation of said periodic electrical input signal.

12. In a circuit for the conversion of a periodic electrical signal to a signal having an average voltage proportional to the frequency of the periodic signal, the circuit comprising a transistor, a first capacitor having one of its terminals connected to the emitter of said first transistor and having the periodic electrical signal applied to its other terminal, a second capacitor, a resistor connected in parallel with said second capacitor, and a diode connected between the emitter of said first transistor and one of the terminals of said second capacitor; the improvement which comprises: means for raising the absolute value of the voltage applied to the base of said transistor above the voltage existing at said one terminal of said second capacitor; and means for providing said circuit with a high input impedance and a low output impedance.